United States Patent
Ward et al.

(10) Patent No.: US 9,618,099 B2
(45) Date of Patent: Apr. 11, 2017

(54) TENSIONER WITH SECONDARY DAMPING

(71) Applicant: GATES CORPORATION, Denver, CO (US)

(72) Inventors: Peter Ward, Farmington Hills, MI (US); John Harvey, Novi, MI (US); Oliver Stegelmann, Strathroy (CA)

(73) Assignee: GATES CORPORATION, Denver, CO (US)

( * ) Notice: Subject to any disclaimer, the term of this patent is extended or adjusted under 35 U.S.C. 154(b) by 80 days.

(21) Appl. No.: 14/797,559

(22) Filed: Jul. 13, 2015

(65) Prior Publication Data
US 2017/0016517 A1    Jan. 19, 2017

(51) Int. Cl.
*F16H 7/12*    (2006.01)
*F16H 7/08*    (2006.01)

(52) U.S. Cl.
CPC ......... *F16H 7/1245* (2013.01); *F16H 7/0838* (2013.01); *F16H 2007/0806* (2013.01); *F16H 2007/0865* (2013.01); *F16H 2007/0893* (2013.01)

(58) Field of Classification Search
CPC ............. F16H 7/1218; F16H 2007/081; F16H 2007/084; F16H 7/1281; F16H 2007/0806
USPC ........................................................ 474/135
See application file for complete search history.

(56) References Cited

U.S. PATENT DOCUMENTS

| | | | | |
|---|---|---|---|---|
| 280,276 A | * | 6/1883 | Withington | .................... 474/135 |
| 660,570 A | * | 10/1900 | Green | .................... F16H 7/1281 474/135 |
| 1,401,169 A | * | 12/1921 | McCuen | .................. F16H 7/129 474/135 |
| 2,044,719 A | * | 6/1936 | Stegeman | ............. F16H 7/1281 474/135 |
| 3,365,968 A | * | 1/1968 | Merriman | ............. F16H 7/1272 416/170 R |
| 3,978,737 A | * | 9/1976 | Bailey | .................... F16H 7/0848 474/138 |
| 4,040,305 A | * | 8/1977 | Cadic | ......................... F16H 7/08 474/135 |
| 4,077,272 A | * | 3/1978 | Busso | .................... F16H 7/1281 474/110 |
| 4,145,934 A | * | 3/1979 | Sragal | ..................... F16H 7/129 474/135 |
| 4,291,416 A | * | 9/1981 | Hoeptner, III | .......... F02B 67/06 188/67 |
| 4,351,636 A | * | 9/1982 | Hager | ...................... F02B 67/06 474/135 |
| 4,361,363 A | * | 11/1982 | Livesay | ............... B62D 55/108 305/125 |

(Continued)

*Primary Examiner* — Henry Liu
(74) *Attorney, Agent, or Firm* — Jeffrey A. Thurnau, Esq.; Paul N. Dunlap, Esq.

(57) ABSTRACT

A tensioner comprising a shaft, a base, a pivot arm pivotally engaged with the base, a pulley journalled to the pivot arm, a first spring urging a first damping member into a frictional engagement with the pivot arm, the first spring engaged with the base, the first damping member imparting a damping force greater in a first pivot arm direction than in a second pivot arm direction, and a second spring disposed in the pivot arm and urging a second damping member into a frictional engagement with a base surface, the base surface comprises an arcuate form having a radius that is variable from a minimum value to a maximum value.

6 Claims, 8 Drawing Sheets

(56) References Cited

U.S. PATENT DOCUMENTS

| | | | | |
|---|---|---|---|---|
| 4,416,648 A * | 11/1983 | Radocaj | ............ | F16H 7/1272 474/135 |
| 4,696,663 A * | 9/1987 | Thomey | ............ | F16H 7/1218 474/133 |
| 4,713,045 A * | 12/1987 | Kodama | ............ | F16H 7/1281 474/135 |
| 4,742,649 A * | 5/1988 | Fuchs | ............ | B24B 21/18 198/814 |
| 4,906,222 A * | 3/1990 | Henderson | ............ | F16H 7/1218 474/135 |
| 4,934,988 A | 6/1990 | Kawamura et al. | | |
| 5,045,031 A | 9/1991 | Thomey | | |
| 5,073,148 A | 12/1991 | Dec | | |
| 5,098,347 A | 3/1992 | Sajczvk et al. | | |
| 5,246,403 A * | 9/1993 | Uphaus | ............ | F16H 9/14 474/117 |
| 5,366,417 A * | 11/1994 | Shimaya | ............ | F16H 7/0848 474/112 |
| 5,470,280 A * | 11/1995 | Ayukawa | ............ | F16H 7/1218 474/135 |
| 5,540,627 A * | 7/1996 | Miyata | ............ | F16H 7/1218 474/112 |
| 5,571,061 A * | 11/1996 | Tsai | ............ | F16H 7/1281 474/135 |
| 5,591,094 A * | 1/1997 | Farmer | ............ | F16H 7/1218 474/117 |
| 5,632,697 A * | 5/1997 | Serkh | ............ | F16H 7/1218 474/109 |
| 5,935,032 A * | 8/1999 | Bral | ............ | F16H 7/1218 474/117 |
| 5,938,552 A * | 8/1999 | Serkh | ............ | F16H 7/1218 474/117 |
| 5,964,674 A * | 10/1999 | Serkh | ............ | F16H 7/1218 474/101 |
| 6,120,401 A * | 9/2000 | Wilken | ............ | F16H 7/0827 474/109 |
| 6,155,942 A * | 12/2000 | Ullein | ............ | F16H 7/1236 474/101 |
| 6,264,578 B1 * | 7/2001 | Ayukawa | ............ | F16H 7/1218 474/109 |
| 6,282,873 B1 * | 9/2001 | Wilken | ............ | F16H 7/0827 474/109 |
| 6,582,332 B2 * | 6/2003 | Serkh | ............ | F16H 7/1218 474/109 |
| 6,592,482 B2 * | 7/2003 | Serkh | ............ | F16H 7/1218 192/45.018 |
| 6,605,013 B2 * | 8/2003 | Chambers | ............ | F16H 7/1281 474/133 |
| 6,607,459 B1 * | 8/2003 | Serkh | ............ | F16H 7/1218 474/117 |
| 6,609,988 B1 * | 8/2003 | Liu | ............ | F16H 7/1218 474/133 |
| 6,884,191 B2 * | 4/2005 | Temma | ............ | F16H 9/20 474/109 |
| 7,004,863 B2 * | 2/2006 | Serkh | ............ | F16H 7/1218 474/109 |
| 7,090,606 B2 * | 8/2006 | Dec | ............ | F16H 7/1281 474/117 |
| 7,226,377 B2 * | 6/2007 | Kraus | ............ | F16H 7/1209 474/117 |
| 7,419,447 B2 | 9/2008 | Serkh | | |
| 7,494,434 B2 * | 2/2009 | Mc Vicar | ............ | F16H 7/1281 474/101 |
| 7,699,732 B2 * | 4/2010 | Message | ............ | F16H 7/1281 474/106 |
| 7,803,078 B2 * | 9/2010 | D'Silva | ............ | F16H 7/1218 474/112 |
| 7,824,286 B2 * | 11/2010 | Schmid | ............ | F16H 7/1263 411/546 |
| 8,075,433 B2 * | 12/2011 | Quintus | ............ | F16H 7/1218 474/135 |
| 8,092,328 B2 | 1/2012 | Dec et al. | | |
| 8,118,698 B2 * | 2/2012 | Guhr | ............ | F16H 7/1218 474/135 |
| 8,142,315 B2 * | 3/2012 | Dell | ............ | F16H 7/1218 474/135 |
| 8,157,682 B2 * | 4/2012 | Serkh | ............ | F16H 7/1218 474/166 |
| 8,439,781 B2 * | 5/2013 | Lannutti | ............ | F16H 7/1218 474/135 |
| 8,562,467 B2 * | 10/2013 | Mennerat | ............ | F16H 7/1218 474/135 |
| 8,678,965 B2 * | 3/2014 | Ishida | ............ | F16H 7/1218 474/113 |
| 8,784,244 B2 * | 7/2014 | Lannutti | ............ | F16D 13/28 192/113.32 |
| 9,005,061 B2 * | 4/2015 | Liebel | ............ | F16H 7/10 474/112 |
| 2002/0010045 A1 * | 1/2002 | Serkh | ............ | F16H 7/1218 474/135 |
| 2002/0177499 A1 * | 11/2002 | Ayukawa | ............ | F16H 7/1218 474/135 |
| 2003/0017894 A1 | 1/2003 | Kaiser et al. | | |
| 2003/0216204 A1 * | 11/2003 | Serkh | ............ | F16H 7/1218 474/135 |
| 2005/0096168 A1 * | 5/2005 | Serkh | ............ | F16H 7/1218 474/135 |
| 2005/0250609 A1 * | 11/2005 | Ayukawa | ............ | F16H 7/1218 474/109 |
| 2006/0293135 A1 * | 12/2006 | Quintus | ............ | F16H 7/1218 474/135 |
| 2007/0249446 A1 * | 10/2007 | Hao | ............ | F16H 7/1218 474/135 |
| 2008/0220919 A1 * | 9/2008 | Antchak | ............ | F16H 7/1218 474/135 |
| 2008/0274846 A1 * | 11/2008 | Ayukawa | ............ | F16H 7/1218 474/135 |
| 2009/0275432 A1 | 11/2009 | Dell | | |
| 2010/0184546 A1 * | 7/2010 | Singer | ............ | F16H 7/1218 474/135 |
| 2010/0323833 A1 * | 12/2010 | Quintus | ............ | F16H 7/1218 474/135 |
| 2011/0300976 A1 * | 12/2011 | Lannutti | ............ | F16H 7/1218 474/135 |
| 2013/0095966 A1 * | 4/2013 | Staley | ............ | F16H 7/1218 474/135 |
| 2013/0150191 A1 | 6/2013 | Ishida | | |

* cited by examiner

TENSIONER WITH SECONDARY DAMPING

FIELD OF THE INVENTION

The invention relates to a tensioner, and more particularly, to a tensioner having a first damping member engaging a pivot arm and a second damping member engaging a base.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory has a pulley mounted on a shaft for receiving power from some form of belt drive. In early systems, each accessory was driven by a separate belt that ran between the accessory and the crankshaft. Due to improvements in belt technology, single serpentine belts are now generally used in most applications. A single serpentine belt routed among the various accessory components drives the accessories. The engine crankshaft drives the serpentine belt.

Since the serpentine belt must be routed to all accessories, it has generally become longer than its predecessors. To operate properly, the belt is installed with a pre-determined tension. As it operates, it stretches slightly over its length. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp operational oscillations.

Various damping mechanisms have been developed. They include viscous fluid dampers, mechanisms based on frictional surfaces sliding or interaction with each other, and dampers using a series of interacting springs. For the most part these damping mechanisms operate in a single direction by resisting a movement of a belt in one direction. This generally resulted in undamped vibrations existing in a belt during operation as the tensioner arm oscillated between loaded and unloaded positions.

Representative of the art is U.S. Pat. No. 6,609,988 which discloses an asymmetric damping tensioner system for belt drives on an engine. A belt is connected between a driver pulley on a crankshaft and any number of driven pulleys. Each driven pulley is connected to an accessory such as an alternator, power steering pump, compressor or the like. The tensioner is placed anywhere before the first component of significant effective inertia, in the belt movement direction. A biasing member in the tensioner is used to maintain a tension in the belt. The tensioner further comprises a damping mechanism to damp belt vibrations caused by the operation of the engine. Tensioner damping friction is unequal or asymmetric, depending upon the direction of movement of the tensioner arm. During acceleration the damping friction of the tensioner in the unloading direction is significantly lower than the damping friction in the opposite, or loading direction, as is the case during deceleration. Lower damping friction during acceleration allows the tensioner arm to quickly adjust to the increase in belt length caused by acceleration. Higher damping friction during deceleration prevents the tensioner arm from being moved too far in the loading direction thereby causing slipping and noise. Asymmetric damping also significantly diminishes overall vibration in the belt during all phases of operation.

What is needed is a tensioner having a first damping member engaging a pivot arm and a second damping member engaging a base. The present invention meets this need.

SUMMARY OF THE INVENTION

The primary aspect of the invention is to provide a tensioner having a first damping member engaging a pivot arm and a second damping member engaging a base.

Other aspects of the invention will be pointed out or made obvious by the following description of the invention and the accompanying drawings.

The invention comprises a tensioner comprising a shaft, a base, a pivot arm pivotally engaged with the base, a pulley journalled to the pivot arm, a first spring urging a first damping member into a frictional engagement with the pivot arm, the first spring engaged with the base, the first damping member imparting a damping force greater in a first pivot arm direction than in a second pivot arm direction, and a second spring disposed in the pivot arm and urging a second damping member into a frictional engagement with a base surface, the base surface comprises an arcuate form having a radius that is variable from a minimum value to a maximum value.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
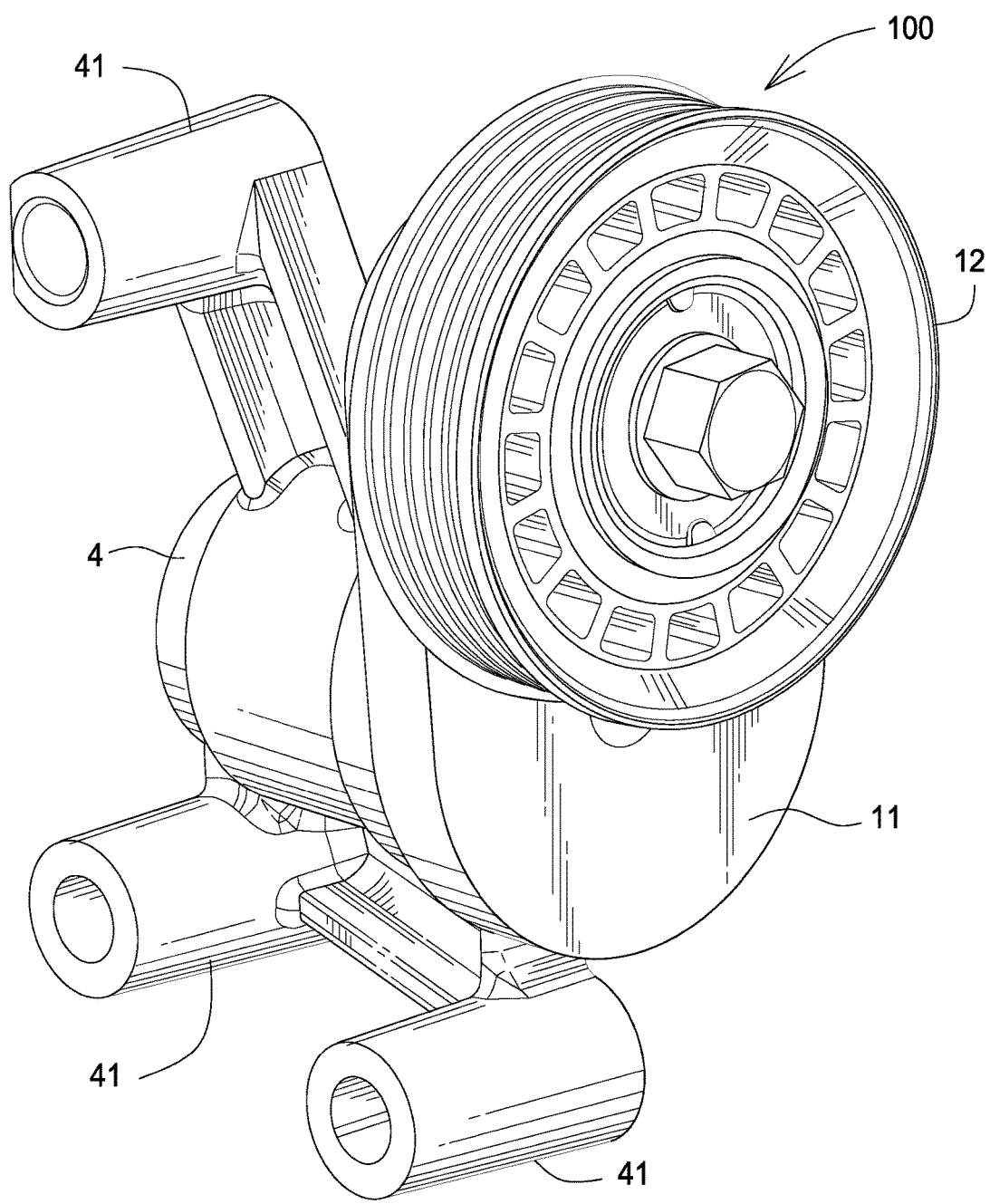
FIG. 1 is a front perspective view of the tensioner.

FIG. 1 is a front perspective view of the tensioner. Tensioner 100 comprises pivot arm 11 which is pivotally mounted to base 4. Pulley 12 is journalled to pivot arm 11. Pulley 12 may engage a multi-ribbed belt or v-belt. Lugs 41 are used to attach the tensioner base to a mounting surface such as a vehicle engine (not shown). Lugs 41 receive fasteners such as bolts (not shown).

Figure 2:
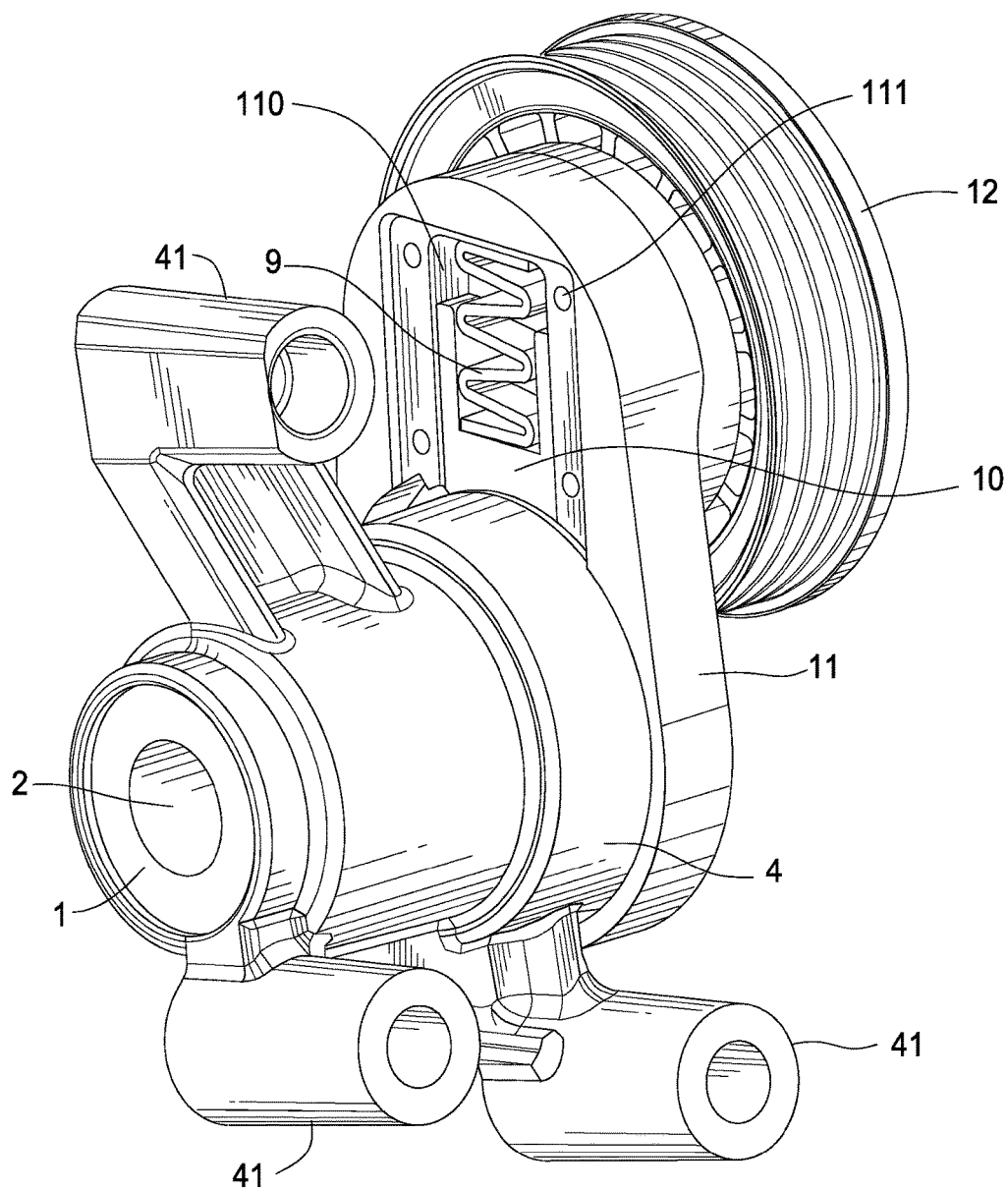
FIG. 2 is a rear perspective view of the tensioner.

FIG. 2 is a rear perspective view of the tensioner. Accordion spring 9 is disposed within cavity 110. Cavity 110 is within pivot arm 11. Spring 9 bears upon damping member 10. Spring 9 is a compression type spring with a spring rate of 177 N/mm by way of example. Damping member 10 is disposed in cavity 110. Damping member 10 is fully contained within pivot arm 4.

An arcuate surface 101 of damping member 10 frictionally engages surface 42 of base 4. The frictional engagement between surface 42 and surface 111 damps an oscillatory movement of the pivot arm 11 relative to base 4. Cover 8 is attached to pivot arm 11 by screws 7. Screws 7 engage holes 111. Plug 1 is used to prevent contamination from entering the tensioner. Pivot shaft 2 acts as a pivot for pivot arm 11.

Figure 3:
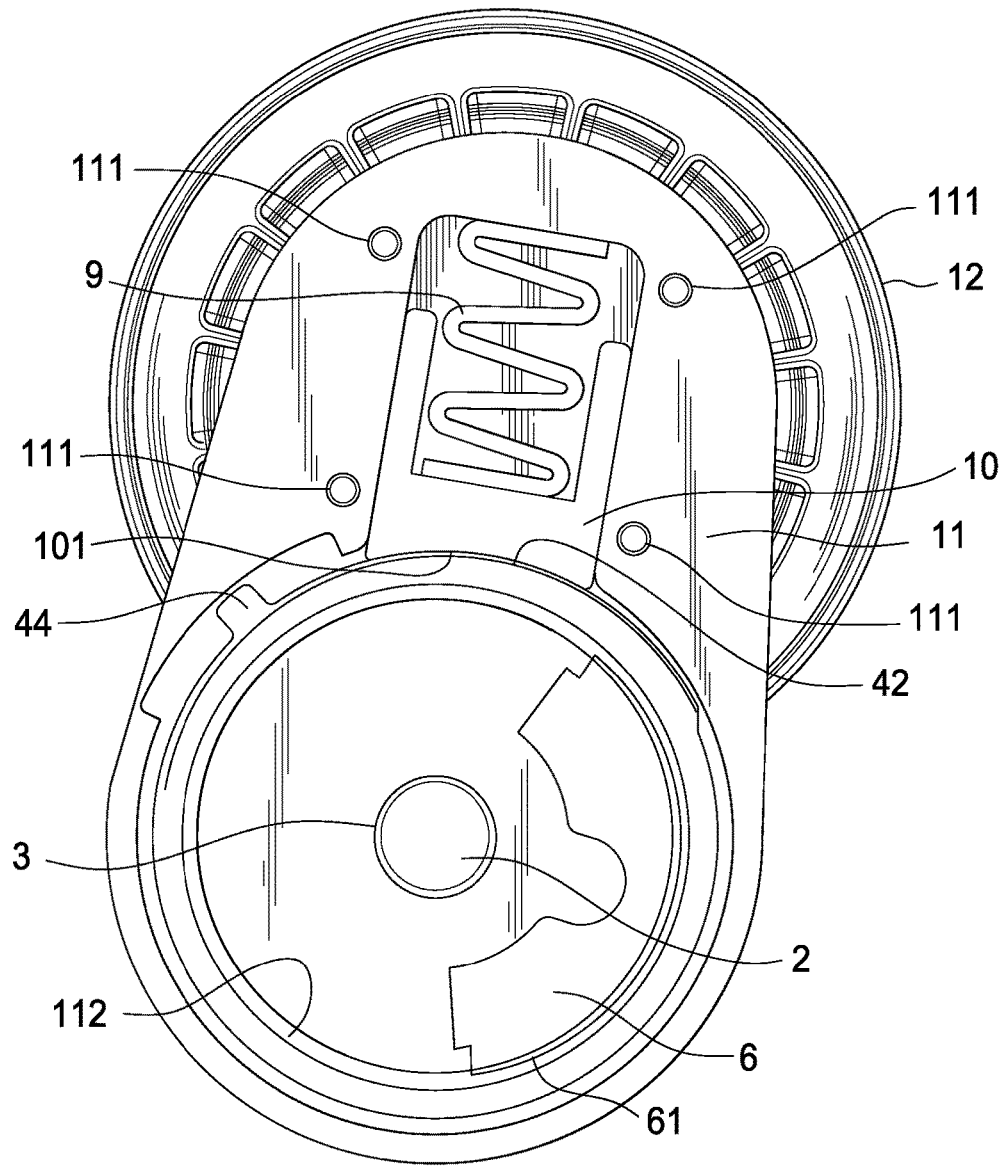
FIG. 3 is a rear plan view of the tensioner.

FIG. 3 is a rear plan view of the tensioner. Pivot arm 11 engages stop 44 which then defines the limits of travel of arm 11. Arcuate surface 101 of damping member 10 frictionally engages surface 42 of base 4. Surface 42 has a cam profile, meaning, radius R1 of surface 42 smoothly varies from a lesser value to a greater value in a circumferential direction about the base, see FIG. 9 and FIG. 10. The cam profile of surface 42 has the effect of increasing or decreasing the damping force generated by damping member 10 depending upon the position of pivot arm 11 in its arc of pivotal movement.

Figure 4:
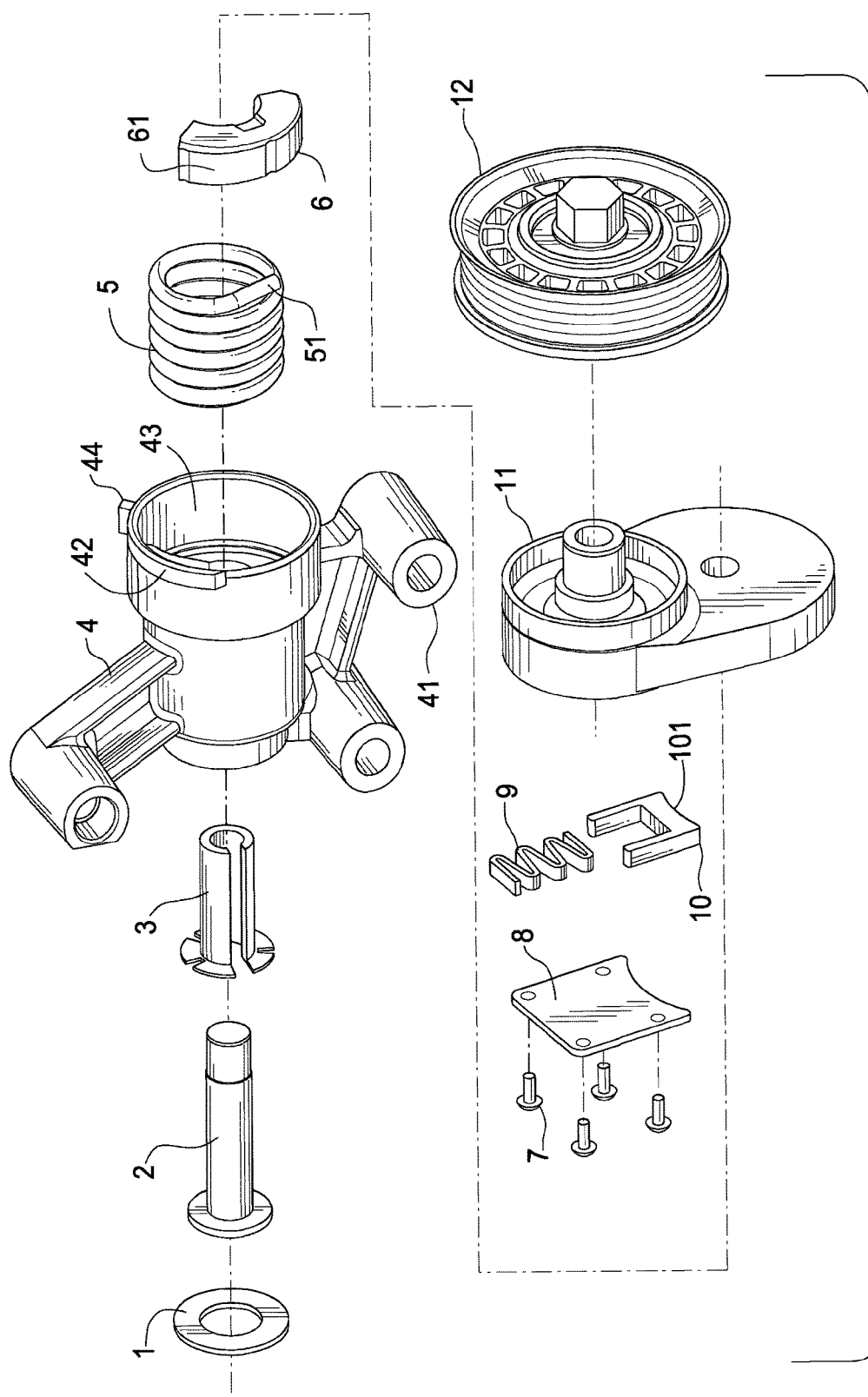
FIG. 4 is a front exploded view of the tensioner.

FIG. 4 is a front exploded view of the tensioner. Pivot arm 11 is press fit to shaft 2. Pivot bushing 3 is housed in base 4. Bushing 3 allows shaft 2 to pivot in base 4. One end 52 of spring 5 engages base 4. The other end 51 of spring 5 engages damping mechanism 6. Spring 5 is a torsion spring.

Base 4 comprises arcuate surface 42 that is engaged by damping member 10. Surface 42 increases the amount of damping by damping member 10 as pivot arm 11 moves away from a belt by increasing the load from accordion spring 9 through compression of spring 9. Damping member 10 damps movement of pivot arm by engagement of the sides of member 10 with pivot arm cavity 110.

Frictional surface 101 of damping member 10 engages surface 42 of base 4. The damping force generated by damping member 10 can be tuned by changing the spring rate of spring 9. Frictional force (damping) is the product of the normal force (N) and the coefficient of friction (μ).

Figure 5:
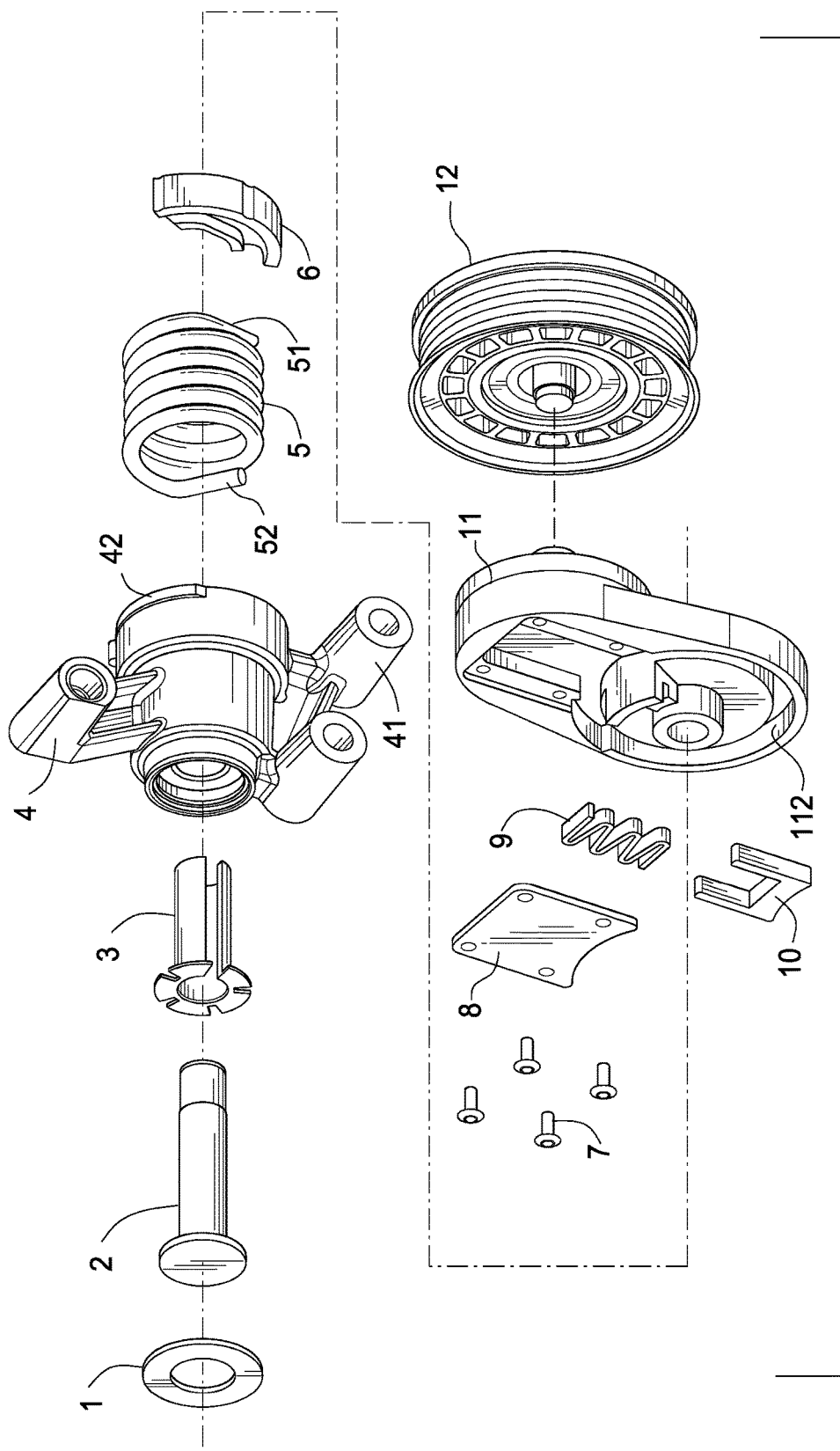
FIG. 5 is a rear exploded view of the tensioner.

FIG. 5 is a rear exploded view of the tensioner. Frictional surface 61 of damping member 6 engages an inner surface 112 of arm 11. Damping member 6 imparts a damping force on arm 11 that is greater in a first pivot arm direction (loading) than in a second pivot arm direction (unloading), namely, the damping is asymmetric.

Figure 11:
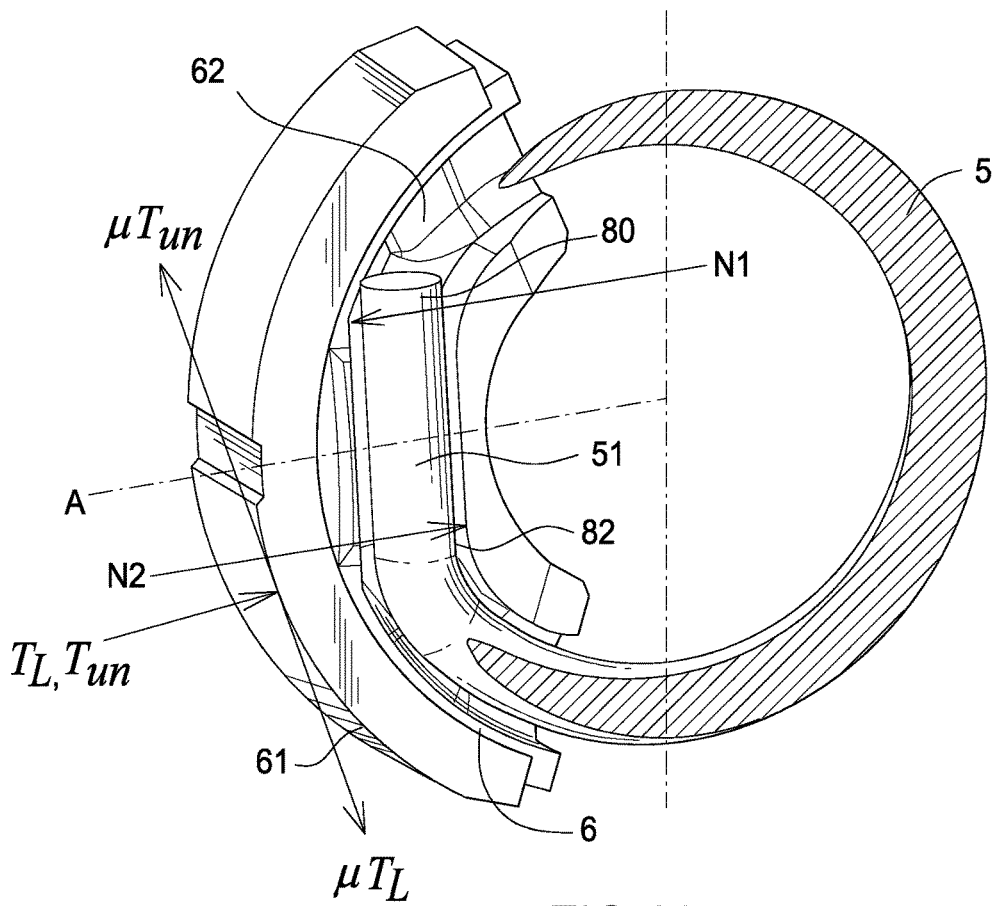
FIG. 11 is a plan view of the first damping member.

Referring to FIG. 11, damping member 6 engages torsion spring 5 at end 51. FIG. 11 is a plan view of the first damping member. Damping member 6 further comprises an outer arcuate friction surface 61 for engagement with the pivot arm surface 112. Damping member 6 comprises first 80 and second 82 spring contact points for operatively connecting to spring end 51. Damping member 6 comprises a channel 62 for receiving spring end 51. Damping member 6 as shown has an arcuate form.

Also shown are the forces acting on the damping member. A first damping force $T_L$ acts on a movement of the pivot arm 11 in a first direction away from a belt and a second damping force $T_{un}$ acts on a movement of the pivot arm in a second direction toward an endless member, the first damping force being greater than the second damping force.

In the stationary position torsion spring 5 spring torque, $T_{spr}$, creates reactions N1 and N2 on first and second contact points 80, 82. The other end of the spring engages the base 4 which is constrained from rotation, resulting in a torque. Damping mechanism 6 is substantially constrained in a predetermined position relative to the pivot arm by end 51.

$\mu T_L$ is greater than $\mu T_{un}$. μ is the coefficient of friction between surface 61 and surface 112. $T_L$ is a torque in the loading direction. $T_{un}$ is a torque in the unloading direction.

Figure 6:
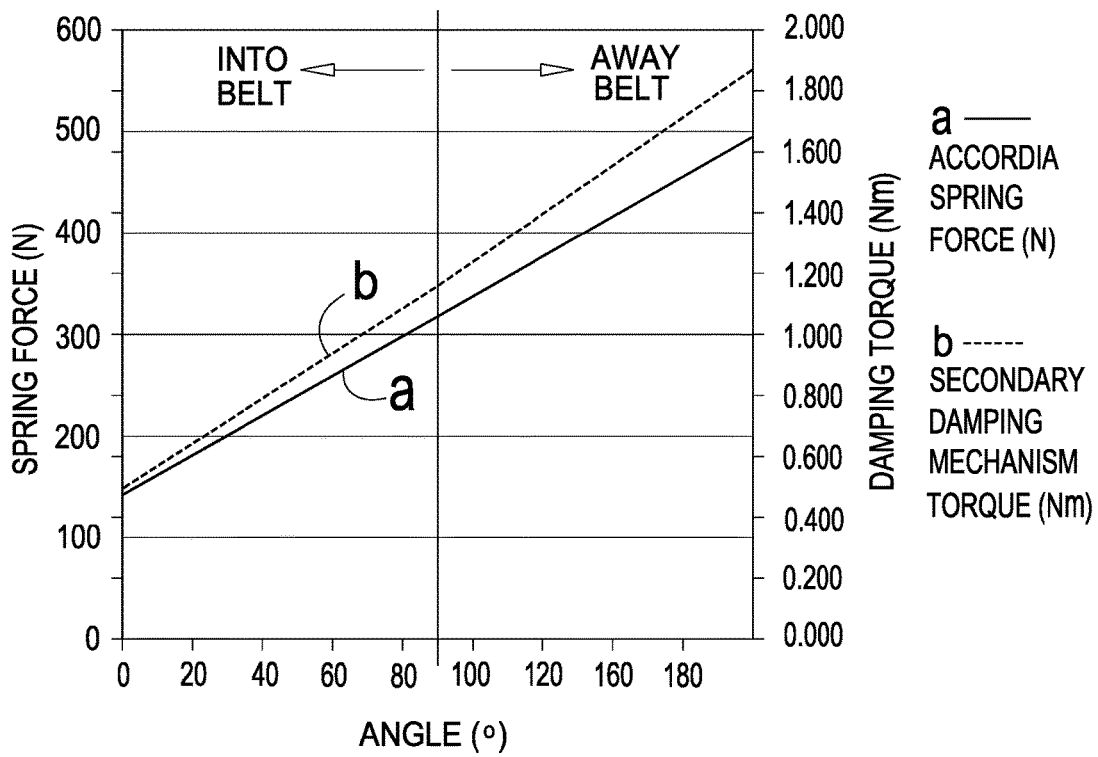
FIG. 6 is a chart of damping torque and spring force.

FIG. 6 is a chart of damping torque and spring force. The effect of the first damping member 6 and the second damping member 10 is shown as the arm 11 is wound from an initial starting position to engagement with a belt, belt not shown.

Figure 7:
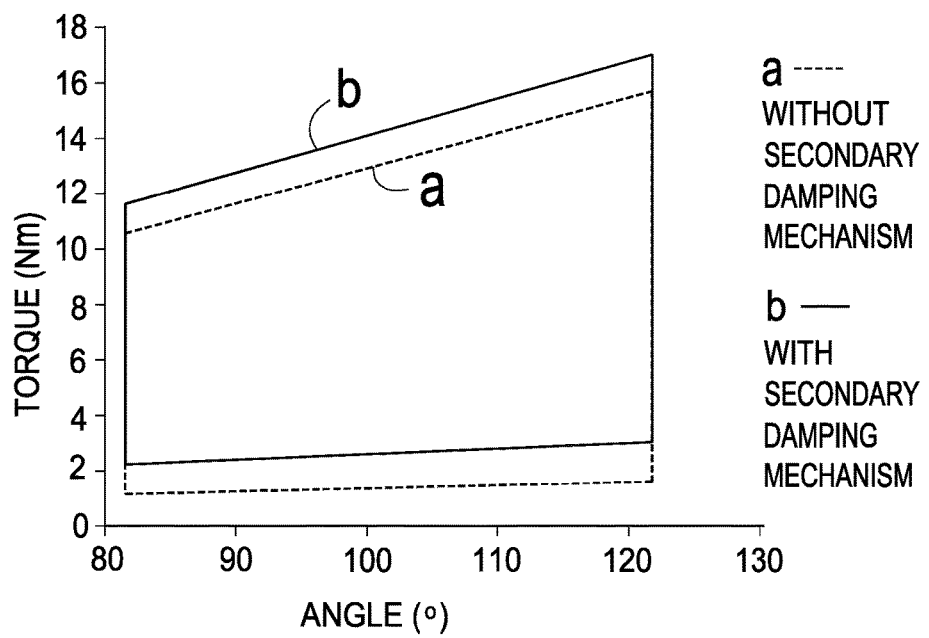
FIG. 7 is a chart of damping torque versus arm angle.

FIG. 7 is a chart of damping torque versus arm angle with and without the secondary damping mechanism. One can see the torque is significantly less for the single damping member (A) when compared to the hysteresis for the combination with the second damping member (B).

Figure 8:
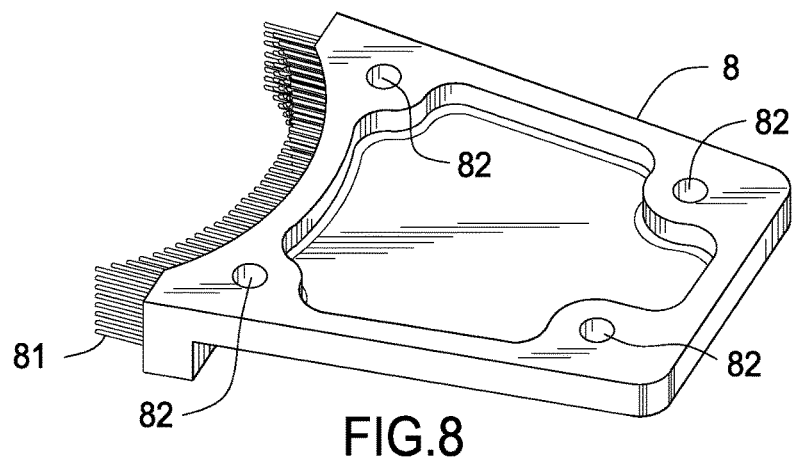
FIG. 8 is a detail of the spring cover.

FIG. 8 is a detail of the spring cover. Cover 8 comprises brush portion 81. Brush portion 81 acts as a seal to prevent entry of debris into cavity 110 and damping member 10. Portion 81 engages an exterior of base 4. Screws 7 engage holes 82.

Figure 9:
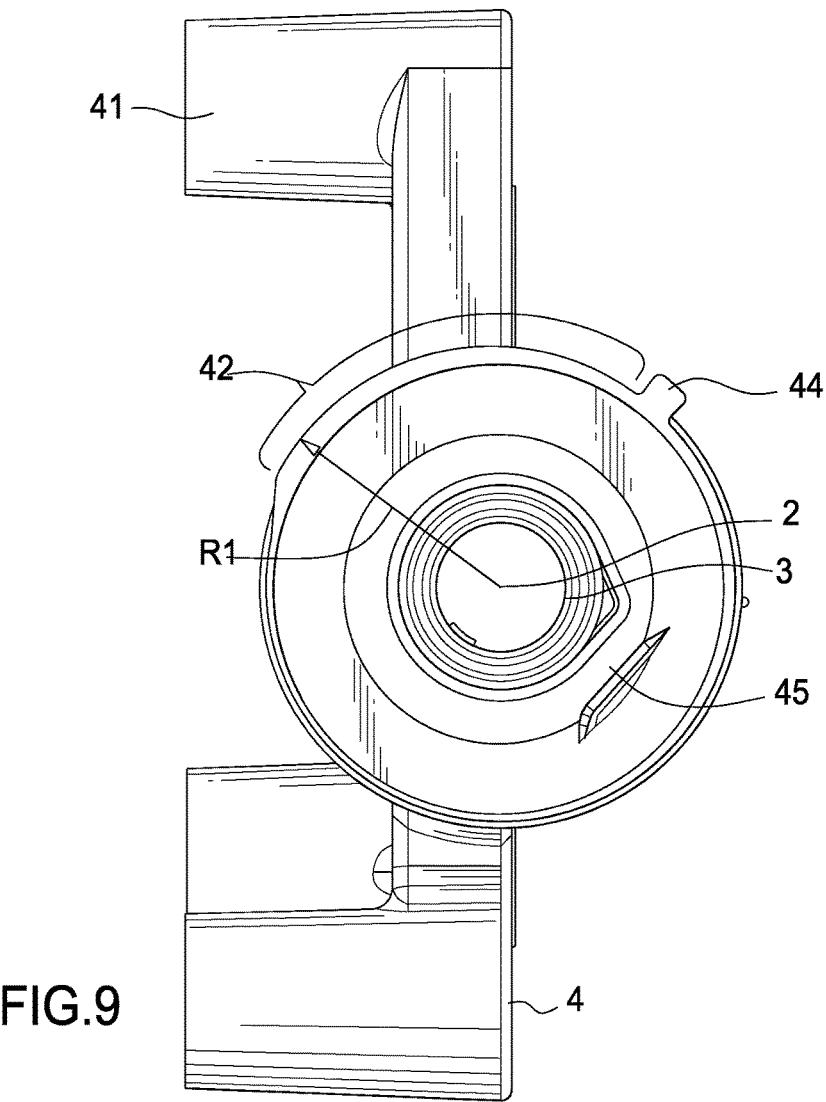
FIG. 9 is a plan view of the base.

FIG. 9 is a plan view of the base. Surface 42 is an arcuate surface outwardly disposed on base 4. Radius R1 gradually increases from a minimum value at stop 44 to a maximum value as indicated by the arrow in a circumferential direction. The slope of surface 42 may vary from a minimum at the arrow to a maximum at stop 44 as well if required. The location of stop 44 is not key to the position of surface 42, it is simply referred to here as a convenient reference. Receiving portion 45 engages end 52 of spring 5, thereby preventing spring 5 from rotating about shaft 2.

Figure 10:
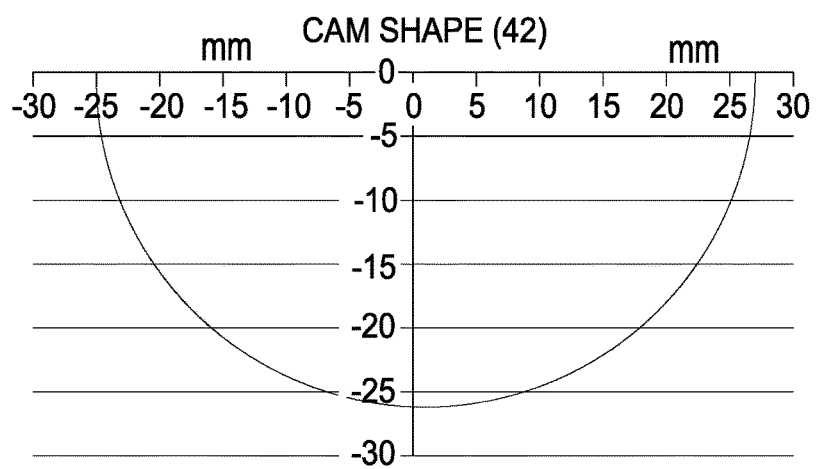
FIG. 10 is a profile of surface 42.

FIG. 10 is a profile of surface 42. For example, in the present embodiment surface 42 has a 4 mm increase in radius R1 over about 180°. This profile is an example only and other profiles for surface 42 are possible to fit the needs of a user. Each profile will determine the damping characteristic contributed by damping member 10. Radius R1 is with respect to the pivot axis of the pivot arm. The pivot axis is the center of shaft 2.

Although a form of the invention has been described herein, it will be obvious to those skilled in the art that variations may be made in the construction and relation of parts and method without departing from the spirit and scope of the invention described herein.

We claim:
1. A tensioner comprising:
   a shaft (2);
   a base (4);
   a pivot arm (11) pivotally engaged with the base;
   a pulley (12) journalled to the pivot arm;
   a first spring (5) urging a first damping member (6) into frictional engagement with the pivot arm, the first spring engaged with the base, the first damping member imparting a damping force greater in a first pivot arm direction than in a second pivot arm direction; and
   a second spring (9) disposed in the pivot arm and urging a second damping member (10) into frictional engagement with a base surface (42), the base surface comprises an arcuate form having a radius (R1) that is variable from a minimum value to a maximum value.

2. The tensioner as in claim 1, wherein the first spring is a torsion spring.

3. The tensioner as in claim 1, wherein the second spring is a compression spring.

4. The tensioner as in claim 1, wherein the second damping member and the second spring are disposed in the pivot arm.

5. The tensioner as in claim 4, further comprising a cover over the second damping member.

6. The tensioner as in claim 5, wherein the cover further comprises a brush portion.

\* \* \* \* \*